United States Patent
Rousseau et al.

(10) Patent No.: US 9,878,489 B2
(45) Date of Patent: Jan. 30, 2018

(54) SPIN-WELDING OF POLYMERIC COMPONENTS HAVING LARGE SURFACE AREA OR NON-COMPLEMENTARY WELD INTERFACES

(71) Applicants: GM Global Technology Operations LLC, Detroit, MI (US); Teijin Limited, Osaka (JP)

(72) Inventors: Ingrid A. Rousseau, Clinton Township, MI (US); Yuhei Konagai, West Bloomfield, MI (US); Yutaka Yagi, Shelby Township, MI (US)

(73) Assignees: GM GLOBAL TECHNOLOGY OPERATIONS LLC; TEIJIN LIMITED (JP)

( * ) Notice: Subject to any disclaimer, the term of this patent is extended or adjusted under 35 U.S.C. 154(b) by 175 days.

(21) Appl. No.: 14/574,699

(22) Filed: Dec. 18, 2014

(65) Prior Publication Data

US 2016/0176103 A1    Jun. 23, 2016

(51) Int. Cl.
| | | |
|---|---|---|
| *B29C 65/06* | (2006.01) | |
| *B29C 65/00* | (2006.01) | |
| *B29L 31/30* | (2006.01) | |

(52) U.S. Cl.
CPC ........ *B29C 65/0672* (2013.01); *B29C 65/069* (2013.01); *B29C 65/0618* (2013.01);
(Continued)

(58) Field of Classification Search
CPC . B29C 65/06; B29C 65/0618; B29C 65/0672; B29C 66/301; B29C 66/30221;
(Continued)

(56) References Cited

U.S. PATENT DOCUMENTS

| | | | |
|---|---|---|---|
| 3,446,688 A | | 5/1969 | Flax |
| 3,631,585 A | * | 1/1972 | Stamm ................ B23K 20/129 |
| | | | 228/114.5 |

(Continued)

FOREIGN PATENT DOCUMENTS

| | | |
|---|---|---|
| CN | 1314554 A | 9/2001 |
| CN | 105711075 A | 6/2016 |

(Continued)

OTHER PUBLICATIONS

Machine Translation of DE19917071. https://worldwide.espacenet.com/, Feb. 7, 2017.*

(Continued)

*Primary Examiner* — Ryan D Kwiecinski

(57) ABSTRACT

Friction-weld assemblies and methods of spin-welding are provided, where the components being joined are polymeric components. Designs provided for the polymeric components enable the use of relatively low speeds and pressures to achieve superior friction weld joints between the components. Further, large surface area polymeric components can be successfully friction welded with such designs. In certain variations, at least one polymeric component has a weld surface with a plurality of surface features that are concave (e.g., grooves) or convex. In other variations, the first component in the weld region has a distinct non-complementary shape from the second component, thus creating a progressive advancing weld line that avoids high temperatures that might incur damage to the polymeric component and weld joint. Such component designs additionally provide for improved flash management at the weld joint.

14 Claims, 7 Drawing Sheets

(52) U.S. Cl.
CPC .......... *B29C 66/126* (2013.01); *B29C 66/301* (2013.01); *B29C 66/30223* (2013.01); *B29C 66/322* (2013.01); *B29C 66/342* (2013.01); *B29C 66/345* (2013.01); *B29C 66/474* (2013.01); *B29C 66/721* (2013.01); *B29C 66/7392* (2013.01); *B29C 66/71* (2013.01); *B29L 2031/3055* (2013.01); *Y10T 403/477* (2015.01)

(58) Field of Classification Search
CPC ............ B29C 66/30223; B29C 66/322; B29C 66/739; B29C 66/7392; B29C 66/73921; B29C 66/73941; Y10T 403/477
USPC ........................................ 228/2.1, 2.3, 114.5
See application file for complete search history.

(56) References Cited

U.S. PATENT DOCUMENTS

| | | | |
|---|---|---|---|
| 6,001,202 | A | 12/1999 | Penttila et al. |
| 6,485,240 | B2 | 11/2002 | Stumpf et al. |
| 7,497,917 | B2 | 3/2009 | Chen et al. |
| 7,695,656 | B2 | 4/2010 | Chen et al. |
| 7,726,542 | B2 | 6/2010 | Kleber |
| 7,938,310 | B2 | 5/2011 | Kleber |
| 7,955,459 | B2 | 6/2011 | Chen et al. |
| 8,631,994 | B2 | 1/2014 | Owen |
| 2001/0024606 | A1* | 9/2001 | Stumpf .................. B29C 65/02 411/82 |
| 2003/0205565 | A1* | 11/2003 | Nelson ................ B29C 65/0672 219/148 |
| 2009/0145949 | A1* | 6/2009 | Aiso .................. B29C 65/0672 228/112.1 |
| 2012/0103295 | A1* | 5/2012 | Owen .................. B23K 20/129 123/184.21 |
| 2013/0122262 | A1 | 5/2013 | Nagakura et al. |

FOREIGN PATENT DOCUMENTS

| | | | | |
|---|---|---|---|---|
| DE | 1297322 | B | 6/1969 | |
| DE | 4244017 | A1 * | 6/1994 | ............ B29C 65/06 |
| DE | 19801987 | A1 | 7/1999 | |
| DE | 19917071 | A1 * | 10/2000 | ............ B23K 20/12 |
| DE | 102011116515 | A1 | 5/2012 | |
| DE | 102015120887 | A1 | 6/2016 | |
| GB | 1019885 | A * | 2/1966 | ............ F16L 11/111 |

OTHER PUBLICATIONS

First Office Action for German Application No. 1020151208873 dated May 15, 2017; 6 pages.
First Office Action for Chinese Application No. 20151949793 dated Jun. 28, 2017 with English language translation; 27 pages.

* cited by examiner

-- PRIOR ART --

SPIN-WELDING OF POLYMERIC COMPONENTS HAVING LARGE SURFACE AREA OR NON-COMPLEMENTARY WELD INTERFACES

FIELD

The present disclosure relates to improved tool component assemblies and methods for friction welding of polymeric components, such as spin-welding, by way of example.

BACKGROUND

This section provides background information related to the present disclosure which is not necessarily prior art.

Friction-welding techniques, including spin-welding, may be used for joining various materials. For example, molded polymeric or plastic components may be joined or assembled via a spin-welding process, where heat is generated through mechanical friction between a moving component and a stationary component. A region of material that is heated near the friction zone softens and may be displaced; thus, a fused region is created having materials from both the moving component and the stationary component. However, there are limitations on conventional spin-welding of polymeric or plastic parts. For example, forming a friction-welded part assembly by spin-welding is typically restricted to using parts having small surface areas and complementary shapes, e.g., parts with mating joint surfaces that are cylindrical and concentric to one another, at the interface to be joined. Furthermore, conventional spin-welding equipment is specialized to exert high speeds and forces on the parts to effectively fuse the interface and thus requires significant equipment expense and training.

Polymeric parts having joint interface regions with large surface areas, complex designs, non-cylindrical and/or non-complementary shapes have not been previously joined using conventional spin welding processes. This is due to the intrinsic shape and dimensions of such parts, which has implications on radius dependent shear, shear rate, and therefore viscosity change during the process. Thus, it has not been previously possible to use spin-welding to join plastic or polymeric parts having large surface area interfaces or interfaces that are non-cylindrical or otherwise non-complementary. It would be desirable to have processes and tools that facilitate spin-welding of parts having joint interface regions with large surface areas or non-complementary shapes to form robust friction-weld joints. Additionally, it would also be advantageous to have the ability to conduct such processes at relatively low speeds on non-specialized equipment.

SUMMARY

This section provides a general summary of the disclosure, and is not a comprehensive disclosure of its full scope or all of its features.

In certain aspects, the present disclosure contemplates a friction-weld assembly, which comprises a first polymeric component comprising a first weld surface defining a first shape. In certain variations, the first weld surface has a plurality of surface features formed therein, where each respective surface feature is concave or convex. In certain aspects, the plurality of surface features are concave features (e.g., grooves) formed in the first weld surface. The friction-weld assembly also comprises a second polymeric component comprising a second weld surface defining a second shape. The friction-weld assembly also comprises a friction weld joint formed between the first weld surface and the second weld surface. One of the first shape or the second shape is convex, while the other is concave. One of the first polymeric component or the second polymeric component remains stationary on a fixed tool, while the other of the first polymeric component and the second polymeric component is rotatable on a rotating tool during a friction welding process that forms the friction weld joint between the first weld surface and the second weld surface. In this manner, the first polymeric component and the second polymeric component are joined together to form the friction-weld assembly.

In other aspects, the present disclosure contemplates a friction-weld assembly, which comprises a first polymeric component comprising a first weld surface defining a first shape. The friction-weld assembly also comprises a second polymeric component comprising a second weld surface defining a second shape. One of the first shape or the second shape is convex, while the other is concave. At least one of the first weld surface or the second weld surface has a surface area corresponding to the friction weld joint of greater than or equal to about 3,000 mm$^2$ (about 4.7 in$^2$). In certain aspects, the first shape and the second shape may be distinct from and non-complementary or asymmetric with respect to one another. The friction-weld assembly further comprises a friction weld joint formed between the first weld surface and the second weld surface. One of the first polymeric component or the second polymeric component remains stationary on a fixed tool, while the other of the first polymeric component and the second polymeric component is rotatable on a rotating tool during friction welding that forms the friction weld joint between the first weld surface and the second weld surface.

In yet other aspects, the present disclosure contemplates a method of spin-welding. The method may comprise rotating a first polymeric component having a first weld surface defining a first shape at a speed of less than or equal to about 3,500 revolutions per minute (rpm). The method also further comprises contacting the first weld surface of the first polymeric component with a second weld surface of a second polymeric component that is held stationary while the first polymeric component rotates to create a weld joint between the first polymeric component and the second polymeric component. One of the first weld surface of the first polymeric component or the second weld surface of the second polymeric component defines a concave region, while the other of the first weld surface or the second weld surface defines a convex region.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an exemplary conventional spin-welding tool component assembly having a complementary set of component parts for a conventional spin-welding process, where the portions of the components to be joined have cylindrical cross-sections and define a concave or inverted cone shape and a convex cone shape in a weld joint region prior to forming the friction weld joint.

FIG. 2 shows a first variation of a friction-welded (e.g., spin-welded) tool or component assembly according to certain aspects of the present disclosure, having a first stationary component and a second rotatable component. The first stationary component has a first weld surface defining a concave interface region and the second rotatable component has a second weld surface defining a complementary convex interface region, which are complementary shapes to one another in a weld joint interface region.

Figure 5:
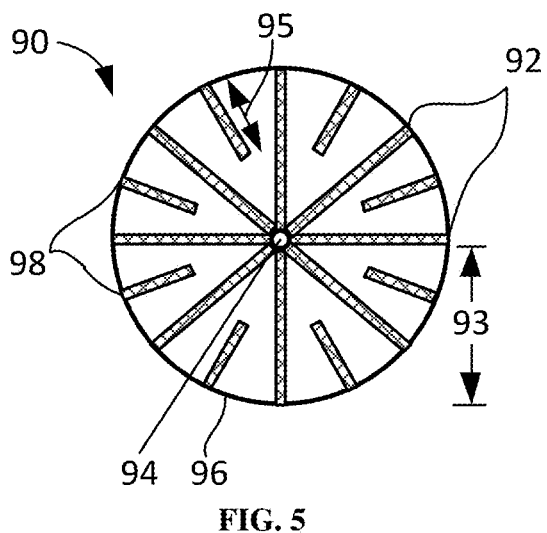

FIG. 5 shows a top or plan view of yet another exemplary weld surface for a friction-welded (e.g., spin-welded) tool or component assembly according to certain aspects of the present teachings, having a first plurality and a second plurality of recessed channels or grooves each defining an elongated rectangular shape formed on a weld surface, where the first plurality of grooves has a first length and the second plurality of grooves has a second length that is less than the first length.

Figure 6:
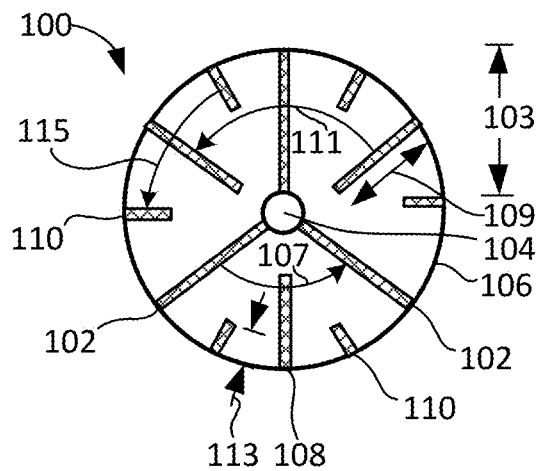

FIG. 6 shows a top or plan view of another exemplary weld surface for a friction-welded (e.g., spin-welded) tool or component assembly according to certain aspects of the present teachings, having a first plurality, a second plurality, and a third plurality of recessed channels or grooves each defining an elongated rectangular shape formed on a weld surface. The first plurality of grooves has a first length, the second plurality of grooves has a second length, and the third plurality of grooves has a third length. The second length is less than the first length, while the third length is less than the first and second lengths.

Figure 7:
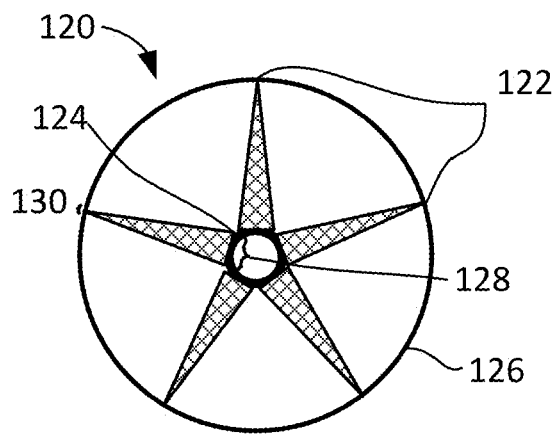

FIG. 7 shows a top or plan view of yet another exemplary weld surface for a friction-welded (e.g., spin-welded) tool or component assembly according to certain aspects of the present teachings, having a first plurality of recessed channels or grooves each defining a triangular shape formed on a weld surface.

Figure 8:
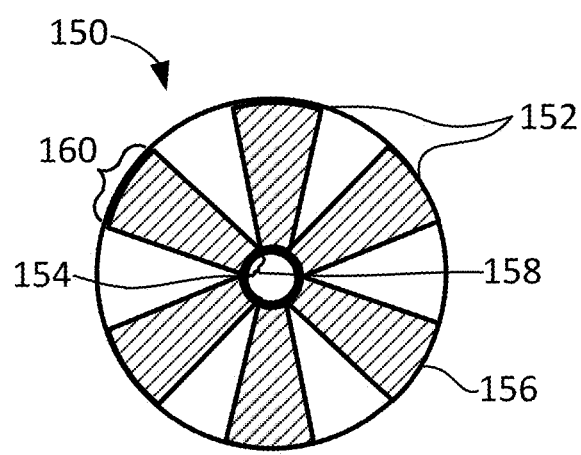

FIG. 8 shows a top or plan view of yet another exemplary weld surface for a friction-welded (e.g., spin-welded) tool or component assembly according to certain aspects of the present teachings, having a first plurality of recessed channels or grooves each defining a quadrilateral shape on a weld surface.

Figure 9:
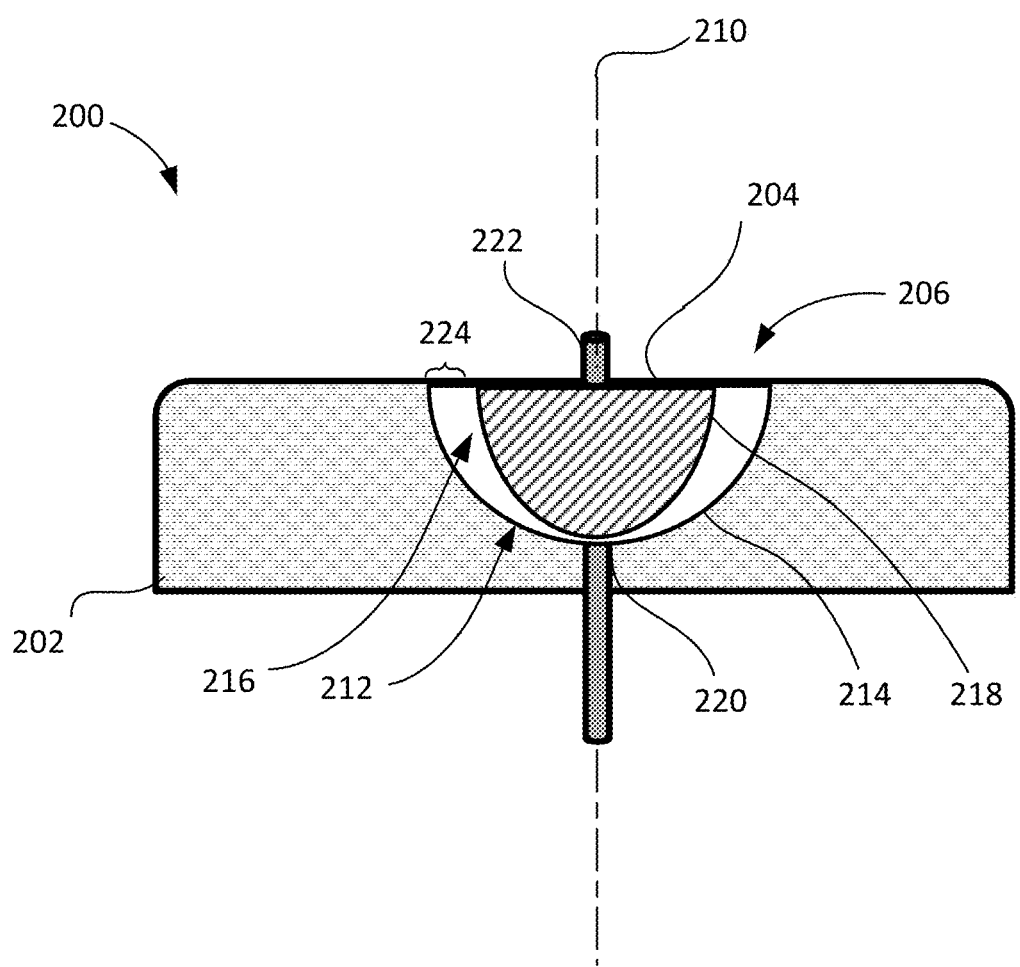

FIG. 9 shows another variation of a friction-welded (e.g., spin-welded) tool or component assembly according to certain aspects of the present disclosure, having a first stationary component and a second rotatable component. The first stationary component has a first weld surface that defines a concave interface region and the second rotatable component has a second weld surface that defines a convex interface region, which are symmetric to an axis of rotation. The respective shapes defined by the first and second weld surfaces are non-complementary or asymmetric shapes to one another.

Figure 10:
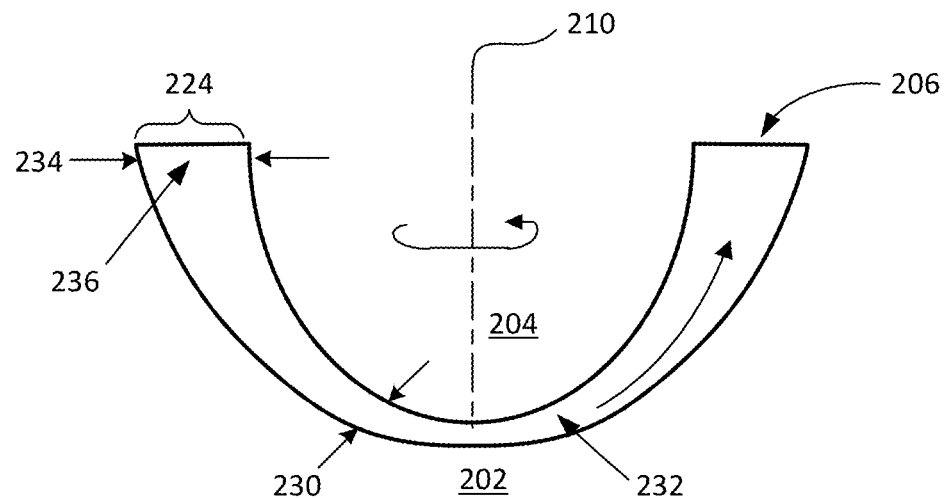

FIG. 10 is a detailed sectional view from FIG. 9 showing a weld joint interface region as a weld joint is formed by spin-welding.

Figure 11:
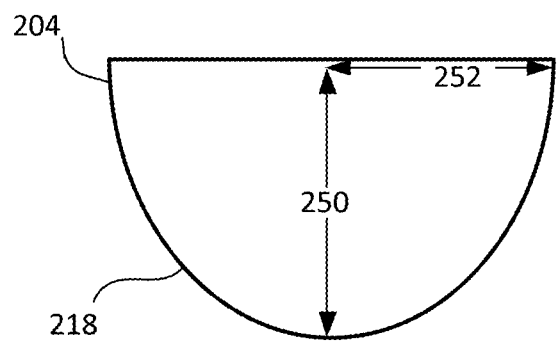

FIG. 11 is a sectional view of the second rotatable component from FIG. 9.

Figure 12:
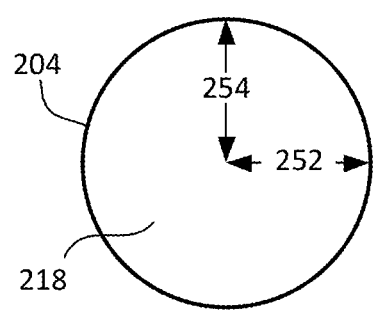

FIG. 12 shows a plan or top view of the second rotatable component in FIGS. 9 and 11.

Figure 13:
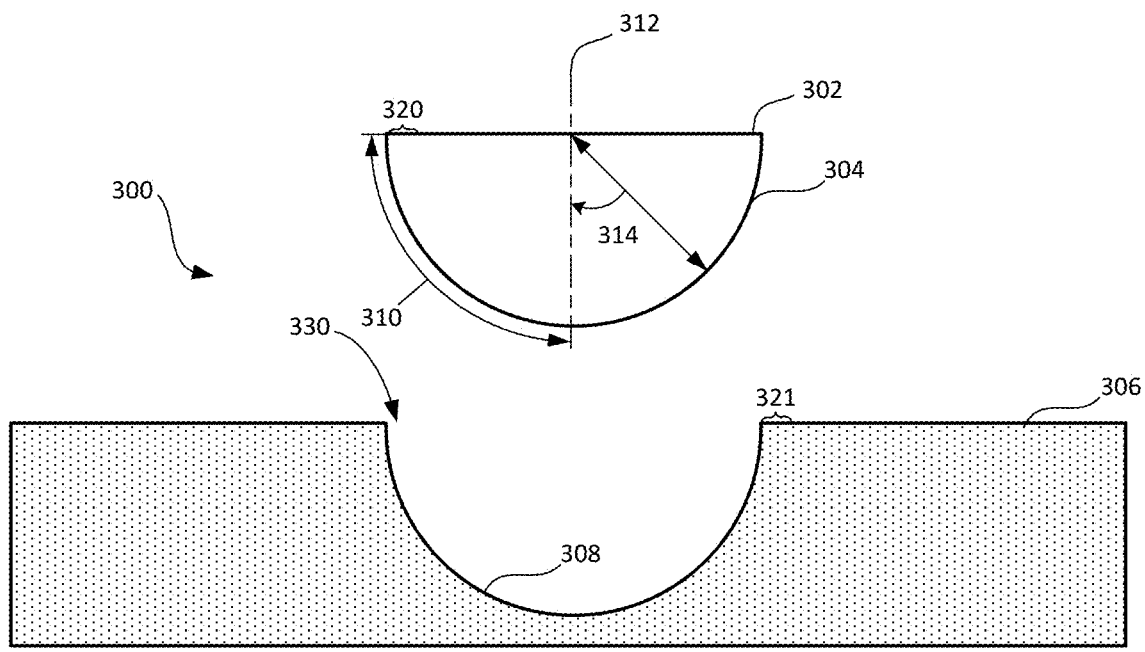

FIG. 13 shows yet another variation of a friction-welded (e.g., spin-welded) tool or component assembly according to certain aspects of the present disclosure, having a first stationary component and a second rotatable component. The first stationary component has a first weld surface that defines a concave interface region and the second rotatable component has a second weld surface that defines a convex interface region, where the respective shapes defined by the first and second weld surfaces are complementary. The second rotatable component illustrates an exemplary design with groove dimensions for the weld surface.

Figure 14:
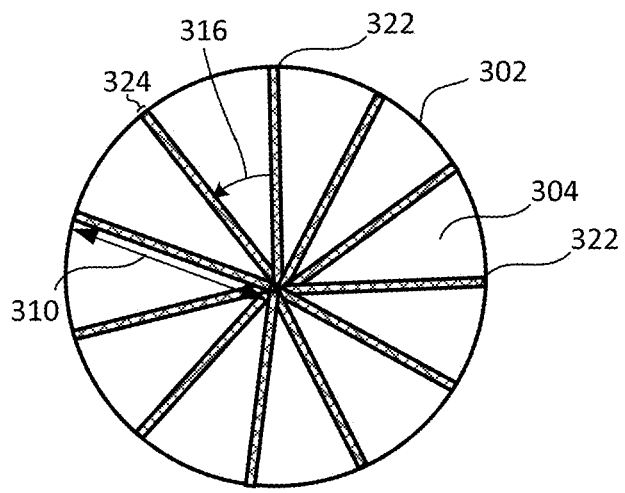

FIG. 14 shows a plan view of the rotatable component like in FIG. 13 having a plurality of grooves formed on the weld surface.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. Disclosure of any ranges relates to the specific embodiments discussed are exemplary and modifying the component or part shape and size may impact any ranges of values listed, as appreciated by those of skill in the art.

Example embodiments will now be described more fully with reference to the accompanying drawings.

Figure 1:
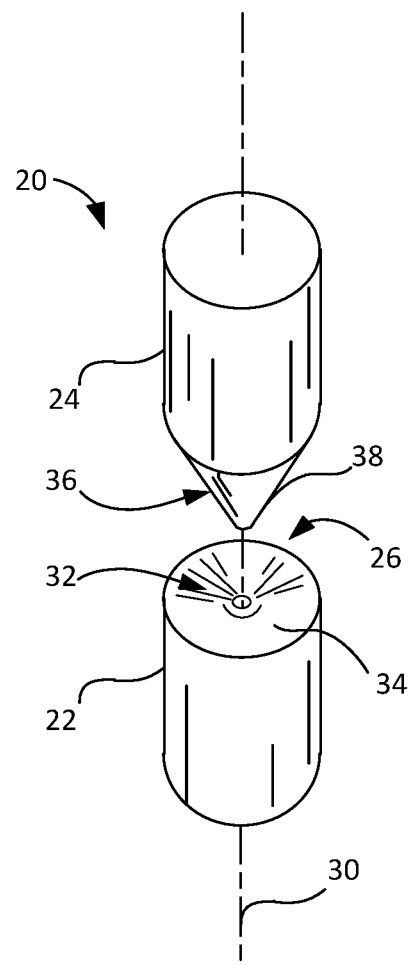

The present disclosure provides new methods and tools for friction-welding, in particular for spin-welding, to join polymeric parts having large surface areas and/or complex, non-complementary or asymmetric joint interface region shapes. By way of background, FIG. 1 shows an exemplary conventional spin-welding tool component assembly 20. A first component 22 may be held stationary, while a second component 24 is rotatable and thus may be rotated or spun about axis 30. Notably, as an initial step, first component 22 and second component 24 are arranged or aligned substantially along axis 30 prior to commencing spin welding. First component 22 defines a concave interface region 32 defining a first tapered surface 34, while second component 24 defines a complementary convex interface region 36 defining a second tapered surface 38. The first component 22 and second component 24 thus each respectively define complementary or mating portions along the first tapered surface 34 of concave interface region 32 and the second tapered surface 38 of convex interface region 36 that will be joined together at a weld joint interface 26, where the friction weld is formed there between.

More specifically, first tapered surface 34 of concave interface region 32 defines an inverted cone shape, while second tapered surface 38 of convex interface region 36 defines a cone shape, both of which are fully symmetrical around axis 30. The complementary cone/inverted cone shapes of the tapered concave interface region 32 and convex interface region 36 are designed to substantially match and join with one another when the first component 22 is contacted with and joined to the second component 24. Accordingly, the complementary cone/inverted cone shapes have symmetric or complementary shapes to one another, in that they define the same shape. Because the conventional spin-welding tool component assembly 20 is fully symmetrical about axis 30, the concave first tapered surface 34 of concave interface region 32 and the convex second tapered surface 38 of convex interface region 36 are specifically adapted to be friction-welded to one another by a process of spin welding.

Spin welding systems thus typically include two tools (for holding the first and second components to be friction-welded). One tool is fixed to hold the stationary component in place, while the other tool provides rotation of the rotating component. Pressure can be applied to the components by the rotating tool during the spin welding process. Before welding, one of the components is attached to the rotating tool. The component attached to the rotating tool is then spun up to a high rate of rotation by a motor. Once rotating at a proper speed, the components to be joined are brought into contact and forced together facilitating heating. Once the materials are solidified and set, a weld is thus formed.

There are several different types of spin-welding. One type is a constant speed spin welding process. Such a process may be a direct drive friction welding, where energy is provided to the system by an electric motor directly connected to a machine spindle connected to the rotating tool. Energy is applied to the interfacing materials until a predetermined amount of heat or a plastic state is obtained at the friction zone. Speed may be held constant for a selected time and/or distance, as pressure is varied. When the desired plastic state is achieved, the rotating component is stopped and a forging load is applied to complete the joining process, making the parts weld into an assembly. As compared to variable speed friction welding, greater total heat typically occurs with direct drive friction welding, which may slow the rate of cooling, resulting in slightly longer cycle times for direct drive friction welding.

In other aspects, spin-welding may alternatively be a variable speed process. One such process is inertia friction welding, where energy may be provided by kinetic energy that is stored in a rotating system or mass. Thus, specific parameters of mass/weight, speed, and pressure are used to meet the requirements of the weld joint. Before welding, one of the components (the rotating component) is attached to a rotating tool, which may be associated with a flywheel of a predetermined weight. The component attached to the rotating tool is then spun via a motor to a high rate of rotation to store energy in the flywheel. Once rotating at a desired speed, the motor is disengaged, and the components to be joined are brought into contact and forced together. When the desired rotational speed is achieved, kinetic energy is transferred into the freely rotating part. Constant forge pressure is applied until a plastic state is reached. Rotation stops due to controlled applied pressure as the desired total displacement length of material (e.g., upset) is achieved. A contact force is kept on the components after the relative rotation between the components stops, thereby allowing the weld to solidify or set. Rotational speeds are normally higher for inertia welding than direct drive friction welding. The majority of the total displacement comes at the very end of the weld cycle, as compared to being spread out over the middle to end of the welding cycle.

With renewed reference to FIG. 1, regardless of whether constant speed or variable speed conventional friction spin weld systems are used, first component 22 and second component 24 of the conventional spin-welding tool component assembly 20 are parts that must have a cylindrical cross section and a relatively small surface area where they are to be joined via friction welding (defined by either the concave interface region 32 or convex interface region 36). By relatively small surface area, in certain aspects, it is meant that the surface area of either weld surface of the component to be joined at the joint interface region may be less than 3,000 mm$^2$ (4.7 in$^2$).

In certain aspects, the present disclosure contemplates spin welding two polymeric parts together, where the surface area of the weld surface corresponding to where the weld joint is formed (in the region of the component to be joined) is a relatively large surface area. By large surface area, in certain aspects, it is meant that the surface area of either weld surface of the component at the joint interface region may be greater than or equal to about 3,000 mm$^2$ (about 4.7 in$^2$), optionally greater than or equal to about 3,225 mm$^2$ (about 5 in$^2$), optionally greater than or equal to about 4,000 mm$^2$ (about 6.2 in$^2$), optionally greater than or equal to about 5,000 mm$^2$ (about 7.8 in$^2$), optionally greater than or equal to about 6,000 mm$^2$ (about 9.3 in$^2$), optionally greater than or equal to about 7,000 mm$^2$ (about 10.9 in$^2$), optionally greater than or equal to about 8,000 mm$^2$ (about 12.4 in$^2$), optionally greater than or equal to about 9,000 mm$^2$ (about 14 in$^2$), optionally greater than or equal to about 10,000 mm$^2$ (about 15.5 in$^2$), optionally greater than or equal to about 12,000 mm$^2$ (about 18.6 in$^2$), optionally greater than or equal to about 15,000 mm$^2$ (about 23.3 in$^2$), optionally greater than or equal to about 17,000 mm$^2$ (about 26.4 in$^2$), optionally greater than or equal to about 20,000 mm$^2$ (about 31 in$^2$), and in certain variations, optionally greater than or equal to about 22,500 mm$^2$ (about 35 in$^2$). In certain variations, the surface area of a weld surface may be greater than or equal to about 3,000 mm$^2$ (about 4.7 in$^2$) to less than or equal to about 22,500 mm$^2$ (about 35 in$^2$), optionally greater than or equal to about 3,225 mm$^2$ (about 5 in$^2$) to less than or equal to about 16,200 mm$^2$ (about 25.1 in$^2$), and in certain variations, optionally greater than or equal to about 6,500 mm$^2$ (about 10 in$^2$) to less than or equal to about 16,200 mm$^2$ (about 25.1 in$^2$).

Figure 2:
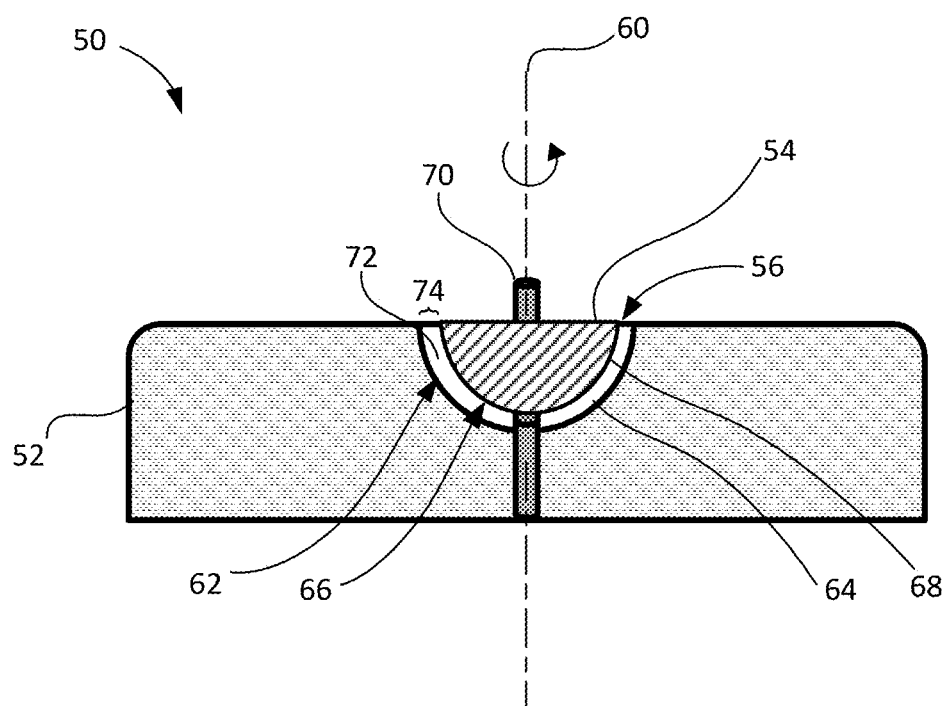

FIG. 2 shows a first variation of a friction-welded (e.g., spin-welded) tool or component assembly 50 according to certain aspects of the present disclosure. A first component 52 may be stationary and is shown in FIG. 2. A second component 54 is rotatable and spun about axis 60. First component 52 defines a concave interface region 62 defining a first weld surface 64, while second component 54 defines a complementary convex interface region 66 defining a second weld surface 68. The first component 52 and second component 54 thus each respectively define complementary or mating portions along the first weld surface 64 of concave interface region 62 and the second weld surface 68 of convex interface region 66 that will be joined together at a weld joint interface 56, where the friction weld is formed there between. In the variation shown, concave interface region 62 and convex interface region 66 together define symmetric shapes that are complementary or concentric to one another and that are symmetric with respect to an axis of rotation, as will be discussed further below.

Both first and second components 52, 54 may be formed of a polymeric material. In certain variations, the polymer may be a thermoplastic polymer, capable of softening under heat of friction and thus forming the fused and bonded joint. The thermoplastic polymer may be formed from any suitable kind of thermoplastic resin. By way of non-limiting example, the thermoplastic polymer may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins.

In certain aspects, the polymeric component is a polymeric composite material that comprises a polymer matrix and a reinforcement material, such as a plurality of reinforcing particles or fibers, distributed therein. In certain aspects, a polymeric composite may include a plurality of carbon fibers, glass fibers, or carbon black, as the reinforcement material, by way of non-limiting example. In certain aspects, a fiber-reinforced composite may be any of the fiber-reinforced composite materials disclosed in U.S. Patent Publication Nos. 2013/0122262 and 2013/0272780, PCT International Publication Nos. WO 2012/117593, WO 2012/105716, WO 2012/102315, WO 2012/105387, WO 2012/105389, WO 2012/105717, WO 2012/108446 and WO 2012/140793, each of which is respectively incorporated herein by reference in its entirety. Particularly suitable fiber-reinforced composites for use as tools or components in accordance with the present disclosure are described in PCT International Publication No. WO 2012/105080 and U.S. patent application Ser. No. 14/056,656 filed on Oct. 21, 2013 entitled "Carbon Fiber Cross Member for Automotive Chassis Structure," each of which is respectively incorporated herein by reference in its entirety.

Thus, in certain variations, suitable fiber-reinforced composite materials may comprise a thermoplastic polymer reinforced with a reinforcement material, such as a carbon fiber material. The fibers (e.g., carbon fibers) may be provided as fiber mats having interconnecting or contacting fibers or may be randomly distributed individual fibers within the resin matrix. Suitable fibers may include relatively short length fibers (having lengths of ≥about 0.1 mm to ≤about 10 mm), relatively long length fibers (having lengths of ≥about 10 mm to ≤about 100 mm), or continuous fibers (having lengths of ≥about 100 mm), and may include any combinations thereof. Long length fibers can provide good balance of moldability/productivity/mechanical performance. The fibers may be chopped, as well.

The fibers or other reinforcements within the composite may be configured in a random-oriented manner, for example, in a substantially two-dimensionally-random oriented or in a specific-direction-oriented manner. In certain variations, suitable fiber-reinforced composite materials may comprise a thermoplastic polymer comprising a reinforcement material distributed with a substantially three-dimensionally random orientation. Such composites may be formed by injection molding resin with the reinforcement material to form the composite. In other aspects, such reinforced composites may be formed by compression molding processes.

In certain variations, a fiber mat comprising carbon fibers may be used with highly planar oriented or uni-directional oriented fibers or a combination thereof. The fiber mat may have a random-oriented fiber for good balance of moldability/productivity/mechanical performance. In certain variations, a random carbon fiber mat can be used as a preform of a fiber-reinforced composite material that is shaped. The random mat may include reinforcing carbon fibers having an average fiber length of greater than or equal to about 3 mm to less than or equal to about 100 mm and a thermoplastic resin. Such a random carbon fiber mat is further described in WO 2012/105080 discussed above. In addition, a uni-directional oriented carbon fiber layer may be included in order to enhance local stiffness and strength.

In certain variations, the fiber-reinforced composite may comprise a reinforcement material that is surface-modified or grafted with a polymer, such as a copolymerized polyolefin attached to a surface of the carbon fibers. The copolymerized polyolefin may contain an aromatic vinyl compound and an acid and/or acid anhydride as copolymerization components, by way of non-limiting example.

As appreciated by those of skill in the art, the reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like. The polymeric composite material may include a fiber-reinforced layer and a resin layer laminated together. Such fiber-reinforced composite materials may be manufactured from a compression molding process. However, in certain preferred aspects, the polymeric component or polymeric composite component is formed by an injection molding process.

With renewed reference to FIG. 2, the concave interface region 62 has an inverted concave hemispherical shape for the first weld surface 64. The second component 54 defines a convex hemispherical shape as the complementary convex interface region 66 defining a second weld surface 68. In various aspects, the present disclosure generally pertains to spin welding of a first component having a recessed region of any shape, or a convex region, defining a first shape, and a second component having a protruding region of any shape, or a concave shape, that can be received with the recessed region of the first component and thus welded together at a weld joint interface. Thus, in the variation shown in FIG. 2, the concave hemispherical shape of the first weld surface 64 and the convex hemispherical shape of the second weld surface 68 are complementary, concentric in that they share the same axis of rotation, and symmetric or complementary to one another. Complementary shapes or complementary partial shapes of the weld surface may include convex and concave spheres, hemispheres, disks, ellipsoids, semi-ellipsoids, toroids, cones, or rods/cylinders, by way of non-limiting example. In certain variations, a shape defined by the weld surfaces of the components to be joined at the weld joint interface may be convex and concave "substantially round-shapes," including shapes or portions of shapes like spheres (e.g., hemispherical), spheroids, ellipsoids (e.g., semi-ellipsoidal), cylinders, globes, annulus, toroids, discs, discoids, domes, egg-shaped, ellipses, orbs, and the like. It is noted that only the weld interface surfaces to be joined may define the shape, while a remainder of the part may or may not have such a shape, thus defining truncated or partial shapes. Thus, the components to be joined with one another via friction welding in accordance with the present disclosure may have any shape. Further, the shapes of the weld interface surface may be complex and are not necessarily restricted to conventional shapes or designs.

In certain variations, the first shape of the first interface region is symmetric, concentric, and complementary to the second shape of the second interface region of the two components to be joined by friction welding (e.g., concave and convex complementary shapes). However, in other variations, the first shape of the first interface region is non-complementary and asymmetric, and/or distinct from the second shape of the second interface region of the two components to be joined by friction welding. The first and second shapes may be independently selected from the illustrative shapes described above. For example, the first shape may be ellipsoidal or semi-ellipsoidal, while the second shape may be spherical or hemispherical, by way of non-limiting example. Even where the first shape and the second shape are non-complementary, they still are concentric and share the same axis of rotation, thus permitting spin-welding.

More specifically, first weld surface 64 of concave interface region 62 defines an inverted hemispherical shape, while second weld surface 68 of convex interface region 66 defines a hemispherical shape, respectively, that are fully symmetrical around axis 60. The rotating second component 54 will spin or rotate about axis 60 in a direction of rotation (shown as counterclockwise, but could be clockwise). In the embodiment shown in FIG. 2, the complementary hemispherical shapes of the concave interface region 62 and convex interface region 66 are designed to substantially match and join with one another (e.g., establish full contact along the first weld surface 64 of concave interface region 62 and second weld surface 68 of convex interface region 66) when the first component 52 is joined with the second component 54. It should be appreciated that the shapes of first weld surface 64 and second weld surface 68 are not limited to the shape shown in FIG. 2, but rather a variety of different shapes are contemplated so long as they are symmetric with one another. Notably, the spin-welded tool component assembly 50 in the embodiment shown in FIG. 2 is thus symmetrical about axis 60, where the concave first weld surface 64 of concave interface region 62 and the convex second weld surface 68 of convex interface region 66 are specifically adapted to be friction-welded to one another by a process of spin welding.

As shown, second component 54 has been molded around an insert 70 (e.g., a spindle or rod). Thus, first component 52 defines a cavity 72 for receiving insert 70 of second component 54 as the spin-welding joining process occurs. The insert 70 is optional, however, and may be employed to facilitate rotation of the second component 54 within the rotating tool assembly. Alternatively, the tool for retaining second component 54 may be modified to hold and rotate the second component 54 during spin-welding. After spin-welding, a welded region 74 is formed between the first component 52 and second component 54 corresponding to the weld joint in interface region 56, where materials have softened and fused to create a robust bond between the first weld surface 64 of concave interface region 62 and the second weld surface 68 of convex interface region 66. In certain aspects, an exemplary weld joint 56 (e.g., a weld collapse zone or melt zone) when joining suitable polymeric components may have an average width of greater than or equal to about 0.5 mm to less than or equal 3 mm.

During spin-welding in an embodiment like that shown in FIG. 2, when the first weld surface 64 (of first component 52) and the second weld surface 68 (of second component 54) are smooth, all the surface area of first weld surface 64 and second weld surface 68 are in contact with one another at the same time during a weld cycle of the spin-welding process. Such extensive contact requires shear forces that vary with the diameter of the welding interface (e.g., shear forces are higher for smaller radii). At the smaller radii, higher shear forces are required, hence requiring high rotation speeds that can result in a non-uniform weld across the surface area. Typically, a limiting factor for spin welding requires parts having small surface area and a small radius). Even with such small radii and surface areas, specialized equipment is required to achieve such high rotation speeds, shear forces, and applied pressure. Furthermore, in conventional systems where the surfaces to be joined are smooth, flash (molten material created by the heat from friction) remains contained at the weld line within the weld joint interface regions and air may be trapped, which can potentially yield a defective weld/joint. Moreover, premature degradation of the polymer could result. Such issues become significantly more problematic where the surface areas of the weld surfaces are relatively large.

Thus, in accordance with certain aspects of the present disclosure, at least one of the weld surfaces at the weld joint interface has a plurality of surface features formed therein, where each respective surface feature is concave or convex. In certain aspects, the plurality of surface features is concave surface features (e.g., grooves) formed in the first weld surface. In other alternative variations, the plurality of surface features may be convex (e.g., protrusions) that serve as energy directors.

Figure 3:
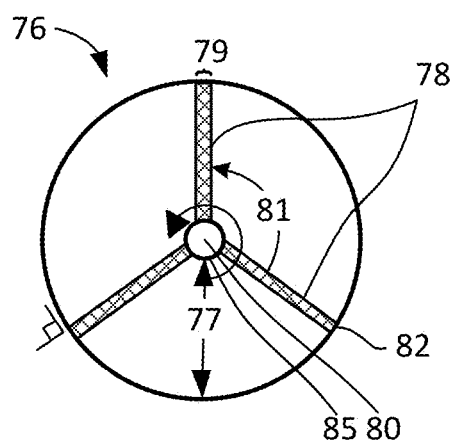
FIG. 3 shows a top or plan view of an exemplary weld surface for a friction-welded (e.g., spin-welded) tool or component assembly according to certain aspects of the present teachings, having a plurality of recessed channels or grooves defining an elongated rectangular shape formed on a weld surface that is perpendicular to a rotation direction.

In certain variations, the first weld surface is patterned with a concave surface feature, in that it has at least one channel or groove formed therein. In accordance with various aspects of the present disclosure, concave surface features, like grooves, help reduce contact area during welding, but also serve to manage flash flow throughout the spin welding process. In certain aspects, the grooves may perpendicular or substantially perpendicular (e.g., may deviate less than 10° from perpendicular) to a direction of welding rotation or spin. Including such a groove or grooves on the contact weld surface provides the ability for constant contact throughout the weld process to occur, while facilitating controlled flash ejection to result in a strong, robust friction weld being formed. For example, as shown in FIG. 3, an exemplary weld surface 76 is shown. Weld surface 76 may be implemented on either the weld surface of the fixed or stationary component (e.g., on first weld surface 64 of first component 52 in FIG. 2) or on the weld surface of the rotating component (e.g., on second weld surface 68 of second component 54 in FIG. 2). Notably, only one weld surface of the pair of components may have one or more of such grooves formed therein, while the other weld surface may remain smooth without requiring one or more grooves. In other aspects, both weld surfaces of the distinct components to be joined may have grooves or a surface pattern formed therein. While a plan view is shown of the weld surface 76, it will be appreciated that the weld surface 76 is three-dimensional and may be a concave shape or a convex shape as preciously described.

A plurality of recessed channels or grooves 78 is defined on weld surface 76. The plurality of grooves 78 may extend from a central region 80 to an outer perimeter 82 of the weld surface 76, thus defining a length from the central region 80 to the outer perimeter 82. An optional insert 85 is present in the central region 80. In FIG. 3, there are three grooves formed within weld surface 76, although fewer or more grooves are likewise contemplated. Furthermore, the plurality of grooves 78 may have a different number, different positions or dimensions and do not necessarily need to fully extend from the central region 80 to the outer perimeter 82. The plurality of grooves 78 serve to manage flash flow during the friction welding as the material softens and becomes molten, thus facilitating flash to flow along the plurality of grooves 78. It should be noted that while grooves or channels are preferred, other surface contours that facilitate outward flash flow during friction welding are likewise contemplated. It should be noted that the surface of weld surface 76 may be tapered and may define a variety of three-dimensional shapes, as discussed above.

In FIG. 3, the weld surface 76 has a radius 77 and each groove 78 has a diameter 79. Each groove 78 defines a shape of an elongated rectangle over the weld surface 76 (when viewed from above). While not shown, a sectional profile of each groove 78 may have a rectangular, square, slit, semi-ellipsoidal, hemispherical, triangle, or other types of channel shapes. An angle 81 is defined between each respective groove 78. As shown, angle 81 is about 120°. In certain variations, an insert component, for example, the rotating component, may have a radius 77 of greater than or equal to about 23 mm to less than or equal to about 72 mm. Thus a length of a groove 78 that extends from the central region 80 to the outer perimeter 82 would be greater than or equal to about 23 mm to less than or equal to about 72 mm. Notably, in certain aspects, the groove may not extend fully to the center of the shape, for example, where the central region 80 is truncated or flat. In certain variations, the groove diameter or width 79 for each respective groove 78 may range from greater than or equal to about 0.5 mm to less than or equal to about 3 mm.

The design shown in FIG. 3 is particularly suitable for variable speed spin-welding processes, such as inertia spin-welding, where increasing force occurs. The recessed grooves 78 designed in the weld surface 76 lower the overall contacting surface area to limit the required welding forces and also to permit for flash management (facilitating flash flow during the welding process) to provide for a variable weld strength in a direction from the outer to inner direction (or from periphery 82 to the central region 80) so as to create a robust friction weld bond between the first and second components to be joined to one another. Such a weld surface design thus enables good welding performance, with limited or no flash production at the edge of the joined parts. Further, such a weld surface design can eliminate the need for post-welding machining or processing to remove protruding flash at the exposed surface of the friction-weld part assembly.

Figure 4:
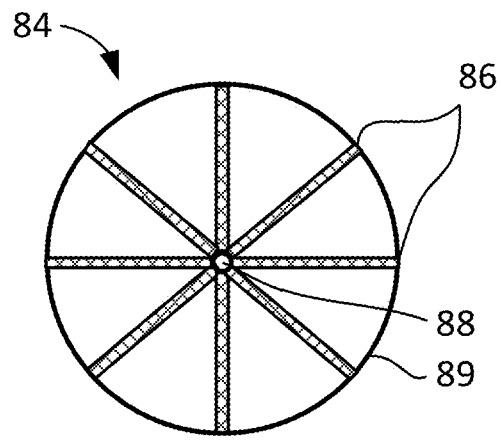
FIG. 4 shows a top or plan view of another exemplary weld surface for a friction-welded (e.g., spin-welded) tool or component assembly according to certain aspects of the present teachings, having a plurality of recessed channels or grooves defining an elongated rectangular shape formed on a weld surface that is perpendicular to a rotation direction.

FIG. 4 shows yet another variation of a modified weld surface for spin-welding according to certain aspects of the present disclosure. An exemplary weld surface 84 is shown. Like the weld surface 76 in FIG. 3, weld surface 84 may be formed on either the weld surface of the fixed or stationary component (e.g., on first weld surface 64 of first component 52 in FIG. 2) or on the weld surface of the rotating component (e.g., on second weld surface 68 of second component 54 in FIG. 2). A plurality of recessed channels or grooves 86 is defined on weld surface 84. The plurality of grooves 86 extend from a central region 88 to an outer perimeter 89 of the weld surface 84. In FIG. 4, eight grooves 86 formed extend from the central region 88 to outer perimeter 89 on weld surface 84, although fewer or more grooves are also contemplated. Furthermore, the plurality of grooves may have differing positions or dimensions and do not necessarily need to fully extend from the central region 88 to the outer perimeter 89. In the design of FIG. 4, it is desirable that the grooves 86 extend either fully or nearly from the central region 88 to outer perimeter 89.

The grooves 86 lower overall surface area to limit the welding forces required and manage flash flow during the friction welding as the material softens and becomes molten permit enhanced flash management. The embodiment shown in FIG. 4 is particularly useful for increasing force processes, for example, variable speed spin-welding processes, which causes a variable welding speed from an inner radial position to an outer radial position. Such a design permits variable weld strength at the weld joint interface from an outer to inner radial position. Such a weld surface design can eliminate the need for post-welding machining or processing to remove protruding flash at the exposed surface of the friction-weld part assembly.

FIG. 5 shows yet another variation of a modified weld surface for spin-welding according to certain aspects of the present disclosure. An exemplary weld surface 90 is shown. Like the weld surface 76 in FIG. 3 or weld surface 84 in FIG. 4, weld surface 90 may be implemented on either the weld surface of the fixed or stationary component (e.g., on first weld surface 64 of first component 52 in FIG. 2) or on the weld surface of the rotating component (e.g., on second weld surface 68 of second component 54 in FIG. 2). A first plurality of recessed channels or grooves 92 is defined on weld surface 90. The first plurality of grooves 92 extend from a central region 94 to an outer perimeter 96 of the weld surface 90. In FIG. 5, there are eight first grooves 92 formed within weld surface 90, although fewer or more grooves are also contemplated. Furthermore, the first plurality of grooves may have differing positions or dimensions and do not necessarily need to fully extend from the central region 94 to the outer perimeter 96. In the design of FIG. 5, it is desirable that the first plurality of grooves 92 extends either fully or nearly from the central region 94 to outer perimeter 96.

Weld surface 90 further includes a second plurality of channels or grooves 98. The second plurality of grooves 98 extend from the outer perimeter 96 inwards, but only extend part of the distance of the radius (e.g., about half of the radius) towards central region 94. As shown, there are 8 second grooves 98, although the number of second grooves, positioning, and dimensions may be varied in certain alternative aspects.

In the design of FIG. 5, length 93 ($L_1$) of the first grooves 92 is greater than the length 95 ($L_2$) of second grooves 98. In certain variations, $L_2$ may be equal to approximately one-half of $L_1$ ($L_1=2L_2$).

The first plurality of grooves 92 and second plurality of grooves 98 both serve to manage flash flow during the friction welding as the material softens and becomes molten, thus facilitating flash to flow along the first plurality of grooves 92 and the second plurality of grooves 98. It should be noted that while grooves or channels are preferred, other surface contours that facilitate outward flash flow during friction welding are likewise contemplated. The design shown in FIG. 5 is particularly suitable for constant force spin-welding processes. The first and second plurality of grooves (92, 98) enable constant surface area contact throughout welding process and furthermore enable flash ejection or flash management (facilitating flash flow during the welding process) to create a robust friction weld bond between the first and second components to be joined to one another. Such a weld surface design thus enables good welding performance, with limited or no flash production at the edge of the joined parts.

FIG. 6 shows another variation of a modified weld surface for spin-welding according to certain aspects of the present disclosure. An exemplary weld surface 100 is shown, which may be formed on either the weld surface of the fixed or stationary component (e.g., on first weld surface 64 of first component 52 in FIG. 2) or on the weld surface of the rotating component (e.g., on second weld surface 68 of second component 54 in FIG. 2). A first plurality of recessed channels or grooves 102 is defined on weld surface 100. The first plurality of grooves 102 extends from a central region 104 to an outer perimeter 106 of the weld surface 100. In FIG. 6, there are three first grooves 102 formed within weld surface 100, although fewer or more grooves are also contemplated. An angle 107 ($\beta_1$) is defined between each respective first groove 102. As shown, angle 107 is about 120°. As noted above, the plurality of grooves 102 may have differing positions or dimensions and do not necessarily need to fully extend from the central region 104 to the outer perimeter 106. In the design of FIG. 6, it is desirable that the first plurality of grooves 102 extends either fully or nearly from the central region 104 to outer perimeter 106. Each first groove 102 defines a length 103 ($L_1$).

Weld surface 100 further includes a second plurality of channels or grooves 108. The second plurality of grooves 108 extends from the outer perimeter 106 inwards, but only extends part of the distance of the radius (e.g., about two-thirds of the radius) towards central region 104. As shown, there are 3 second grooves 108, although the number of second grooves, positioning, and dimensions may be varied in certain alternative aspects. An angle 111 ($\beta_2$) is defined between each respective second groove 108. As shown, angle 111 is about 120°. Each second groove 108 defines a length 109 ($L_2$).

A third plurality of channels or grooves 110 is also formed in weld surface 100. The third plurality of grooves 110 extends from the outer perimeter 106 inwards, but only extends part of the distance of the radius (e.g., about one third of the radius) towards central region 104. As shown, there are six third grooves 110, although the number of third grooves, positioning, and dimensions may be varied in certain alternative aspects. An angle 115 ($\beta_3$) is defined between each respective third groove 110. As shown, angle 115 is about 60°. Each third groove 110 defines a length 113 ($L_3$).

In the design shown in FIG. 6, length 103 ($L_1$) of the first grooves 102 is greater than the length 109 ($L_2$) of second grooves 108 and length 113 ($L_3$) of third grooves 110. The length $L_2$ of second grooves 108 is greater than the length $L_3$ of third grooves 110. In certain variations, $L_2$ is approximately two-thirds of $L_1$ (e.g., $L_1=3/2\ L_2$) and $L_3$ is approximately one-third of $L_1$ (e.g., $L_1=3L_3$).

Like other embodiments, the first plurality of grooves 102, second plurality of grooves 108, and third plurality of grooves 110 serve to manage flash flow during the friction welding as the material softens and becomes molten, thus facilitating flash to flow along the various grooves. It should be noted that while grooves or channels are preferred, other surface contours that facilitate outward flash flow during friction welding are likewise contemplated. The design shown in FIG. 6 is particularly suitable for constant force spin-welding processes. The first, second, and third plurality of grooves (102, 108, 110) enable lowered variability in surface area contact throughout welding process and furthermore enable flash ejection or flash management (facilitating flash flow during the welding process) to create a robust friction weld bond between the first and second components to be joined to one another. Such a weld surface design thus enables good welding performance, with limited or no flash production at the edge of the joined parts. Such a weld surface design can eliminate the need for post-welding machining or processing after spin-welding so as to remove protruding flash at the exposed surface of the friction-weld part assembly.

FIG. 7 shows yet another variation of a modified weld surface 120 for spin-welding according to certain aspects of the present disclosure. The weld surface 120 may be formed on either the weld surface of the fixed or stationary component (e.g., on first weld surface 64 of first component 52 in FIG. 2) or on the weld surface of the rotating component (e.g., on second weld surface 68 of second component 54 in FIG. 2). A plurality of recessed channels or grooves 122 is defined on weld surface 120. The plurality of grooves 122 extend from a central region 124 to an outer perimeter 126 of the weld surface 120. In FIG. 7, there are 5 grooves 122 formed that extend from the central region 124 to outer perimeter 126 on weld surface 120, although fewer or more grooves are also contemplated.

As shown in FIG. 7, each respective groove 122 has a groove diameter or width 128 ($D_{G1}$) at the central region 124, which reduces to a second groove diameter or width 130 ($D_{G2}$) at the outer perimeter 126. $D_{G1}$ is thus significantly greater than the $D_{G2}$. Thus, each respective groove 122 defines a tapered triangular shape forming a star-pattern on the surface. Other groove shapes and widths are likewise contemplated in certain alternative aspects of the present disclosure. Further, as with previously discussed variations, the plurality of grooves 122 may have differing positions or dimensions and do not necessarily need to fully extend from the central region 124 to the outer perimeter 126. In the design of FIG. 7, it is desirable that the grooves 122 extend either fully or nearly from the central region 124 to outer perimeter 126.

FIG. 8 shows yet another variation of a modified weld surface 150 for spin-welding according to certain aspects of the present disclosure. The weld surface 150 may be formed on either the weld surface of the fixed or stationary component (e.g., on first weld surface 64 of first component 52 in FIG. 2) or on the weld surface of the rotating component (e.g., on second weld surface 68 of second component 54 in FIG. 2). A plurality of recessed channels or grooves 152 is defined on weld surface 150. The plurality of grooves 152 extend from a central region 154 to an outer perimeter 156 of the weld surface 150. In FIG. 8, there are 6 grooves 152 formed that extend from the central region 154 to outer perimeter 156 on weld surface 150, although fewer or more grooves are also contemplated. As shown in FIG. 8, each respective groove 152 has a groove diameter or width 158 ($D_{G1}$) at the central region 154, which increases to a second groove diameter or width 160 ($D_{G2}$) at the outer perimeter 156. $D_{G1}$ is smaller than $D_{G2}$ in the embodiment shown. Thus, each respective groove 152 defines a tapered shape, where the groove diameter or width enlarges at the outer perimeter 156 forming a wedge-pattern. Like other embodiments, different groove shapes and widths are likewise contemplated in certain alternative aspects of the present disclosure. Further, as with previously discussed variations, the plurality of grooves 152 may have differing positions or dimensions and do not necessarily need to fully extend from the central region 154 to the outer perimeter 156. In the design of FIG. 8, it is desirable that the grooves 152 extend either fully or nearly from the central region 154 to outer perimeter 156.

In other alternative aspects of the present disclosure, at least one of the weld surfaces at the weld joint interface has a plurality of convex surface features formed therein. Such convex surface features may be protrusions or bumps that serve as energy directors, facilitating the spin welding process by concentrating the initial contact to a limited surface area corresponding to the convex surface features that can serve to facilitate melting initiation, therefore welding initiation as well as to reduce overall amounts of flash generated during the spin welding process. At least one weld surface at the weld joint interface may comprise a plurality of convex surface features, such as round shaped protrusions, bumps, or nubs. Other shapes of convex energy director features are also contemplated, such as elongated ridges.

Thus, in certain aspects, the present disclosure contemplates a friction-weld assembly, which comprises a first polymeric component comprising a first weld surface defining a first shape. The friction-weld assembly also comprises a second polymeric component comprising a second weld surface defining a second shape. One of the first shape and the second shape is convex, while the other is concave. Further, at least one weld surface (either the first or second weld surface) has a plurality of surface features, which may be concave or convex. In certain variations, at least one weld surface has a plurality of concave surface features (e.g., grooves) formed therein. One of the first polymeric component or the second polymeric component remains stationary on a fixed tool, while the other of the first polymeric component and the second polymeric component is rotatable on a rotating tool during a friction welding process that forms a friction weld joint between the first weld surface and the second weld surface. In this manner, the first polymeric component and the second polymeric component are joined together via a friction weld joint. In certain aspects, the first shape and the second shape are complementary and symmetric with respect to one another. In other aspects, the first shape and the second shape may be non-complementary and distinct from one another. In certain variations, the first shape and the second shape are substantially round shapes. In certain other aspects, at least one of the first weld surface or the second weld surface has a large surface area corresponding to the friction weld joint of greater than or equal to about 3,000 mm$^2$ (about 4.7 in$^2$).

In certain variations, the first polymeric component and/or the second polymeric component is formed from a composite material comprising a thermoplastic polymer and a reinforcement material, as discussed above. In certain variations, at least one weld surface has a plurality of concave surface features (e.g., grooves) that extend from a central region of the first weld surface to an outer perimeter of the first weld surface. The number of grooves depends on the volume of space needed to manage flow of melt or flash during the spin welding process, which depends on the overall weld surface, component part size, and the weld joint thickness targeted. In certain examples, the plurality of grooves may comprise greater than or equal to about 3 grooves, optionally greater than or equal to about 4 grooves, optionally greater than or equal to about 5 grooves, optionally greater than or equal to about 6 grooves, optionally greater than or equal to about 7 grooves, optionally greater than or equal to about 8 grooves, optionally greater than or equal to about 9 grooves, optionally greater than or equal to about 10 grooves, optionally greater than or equal to about 11 grooves, optionally greater than or equal to about 15 grooves, optionally greater than or equal to about 20 grooves, optionally greater than or equal to about 25 grooves, optionally greater than or equal to about 30 grooves, optionally greater than or equal to about 35 grooves, optionally greater than or equal to about 40 grooves, optionally greater than or equal to about 50 grooves, optionally greater than or equal to about 60 grooves, optionally greater than or equal to about 70 grooves, optionally greater than or equal to about 80 grooves, optionally greater than or equal to about 90 grooves, optionally greater than or equal to about 100 grooves, optionally greater than or equal to about 110 grooves, optionally greater than or equal to about 120 grooves, optionally greater than or equal to about 130 grooves, optionally greater than or equal to about 140 grooves, optionally greater than or equal to about 150 grooves, optionally greater than or equal to about 160 grooves, optionally greater than or equal to about 170 grooves, and in certain variations, optionally greater than or equal to about 180 grooves. In certain examples, the plurality of grooves may comprise from 3 to 182 grooves, optionally from 3 to 100 grooves, optionally from 6 to 45 grooves in certain variations.

The plurality of grooves optionally comprises both a first plurality of grooves and a second plurality of grooves. The first plurality of grooves extends from a central region of the first weld surface to an outer perimeter of the first weld surface, while the second plurality of grooves defines a second length less than the first length. In other variations, the plurality of grooves further comprises a third plurality of grooves that have a third length that is less than the first length and the second length.

The dimensions of each respective groove depend on the amount of melt to be managed during the spin welding process, which in turn varies with the number of grooves and the overall weld surface and part size. In certain exemplary aspects, each respective groove of the plurality may have a width of greater than or equal to about 0.5 mm to less than or equal to about 3 mm and a depth of greater than or equal to about 0.5 mm to less than or equal to about 3 mm. Each respective groove of the plurality has a shape (viewed along the weld surface) selected from a group consisting of: a triangle, a rectangle, a quadrilateral, and combinations thereof, by way of non-limiting example. A sectional side profile shape of each groove may be rectangular, square, slit, semi-ellipsoidal, hemispherical, triangular, or any other types of channels or depressions that permit flow of flash outwards. Suitable lengths of grooves may vary depending on the weld surface area and shapes used, but in certain variations, a suitable groove length may be greater than or equal to about 1 mm to less than or equal to about 100 mm, optionally greater than or equal to about 2 mm to less than or equal to about 85 mm, optionally greater than or equal to about 3 mm to less than or equal to about 75 mm, and in certain variations, greater than or equal to about 5 mm to less than or equal to about 72 mm.

By way of non-limiting example, an exemplary groove design is illustrated in the context of FIGS. 13 and 14. FIG. 13 shows an exemplary conventional spin-welding tool component assembly 300. A first component 302 is rotatable about an axis 312, while a second component 306 may be held stationary. First component 302 defines a first weld surface 304 defining a convex shape, while second component 306 defines a complementary concave shape defined by second weld surface 308. As shown in FIG. 13, the first weld surface 304 and second weld surface 308 define complementary shapes. The first weld surface 304 and the second weld surface 308 will be joined together at an interface or weld joint 330, where the friction weld is formed there between. In certain aspects, an exemplary weld joint 330 (e.g., a weld collapse zone or melt zone) includes a portion of each weld surface (shown as width 320 on first weld surface 304 of first component 302 and width 321 on second component 304).

For an exemplary method of determining groove dimensions, the first component 302 and the second component 306 have complementary hemispherical shapes where an angle 314 formed between axis 312 and a radius extending to different regions of the first weld interface surface 304 varies from 30 to 90 degrees. A radius of the first component 302 may range from about 23 mm to about 72 mm (e.g., 23 mm $(=R_{Insert}^{min})<R_{Insert} \leq 72$ mm $(=R_{Insert}^{max})$). For purposes of this example, "insert" refers to the first component 302 and "part" refers to the second component 306. $R_{Insert}=R_o+$"collapse width" and $R_{Part}=R_o-$"collapse," where $R_o$ is defined as the "weld line" radius or width (including both 320 and 321 in FIG. 13). Thus, a representative collapse for insert or first component 302 is shown as width 320 (approximately ½ of weld line width 330). In this example, the collapse width may range from 0.5 mm to 1 mm.

As shown in FIG. 14, a first plurality of recessed channels or grooves 322 is defined on weld surface 304 of the insert or first component 302. In FIG. 14, there are eleven representative grooves 322 formed within weld surface 304 for purposes of illustration. As can be seen, each groove 322 has a length 310 extending along the region where the weld joint will be formed. Each respective groove 322 has a diameter or width 324 ranging from about 1 mm to about 3 mm. Each respective groove 322 is separated from adjacent grooves 322 by an angle (β) 316. The weld time is assumed to be about 3 seconds in duration with a rotation speed of about 3,000 rpm. Calculations for a range of groove volumes and possible number of grooves for the minimum and maximum $R_{Insert}$ are calculated in Table 1 below.

TABLE 1

| Collapse (mm) | Volume/ groove (mm³) for $R_{Insert}^{min}$ | Volume/ groove (mm³) for $R_{Insert}^{max}$ | Approx. number of grooves ($n_G$) for $R_{Insert}^{min}$ | Approx. number of grooves ($n_G$) for $R_{Insert}^{max}$ | β (deg) for $R_{Insert}^{min}$ | β (deg) for $R_{Insert}^{max}$ |
|---|---|---|---|---|---|---|
| Groove diameter = 1 mm | | | | | | |
| 0.50 | 57 | 177 | 29 | 91 | 12.5 | 4.0 |
| 0.75 | 57 | 177 | 43 | 136 | 8.4 | 2.6 |
| 1.00 | 58 | 178 | 57 | 181 | 6.3 | 2.0 |
| Groove diameter = 2 mm | | | | | | |
| 0.50 | 228 | 709 | 7 | 23 | 50.0 | 15.8 |
| 0.75 | 229 | 710 | 11* | 34* | 33.5* | 10.6* |
| 1.00 | 230 | 711 | 14* | 45* | 25.3* | 7.9* |
| Groove diameter = 3 mm | | | | | | |
| 0.50 | 513 | 1595 | 3 | 10 | 112.5 | 35.6 |
| 0.75 | 515 | 1597 | 5 | 15 | 75.4 | 23.8 |
| 1.00 | 518 | 1600 | 6 | 20 | 56.8 | 17.9 |

By way of further example, the entries designated (*) with the 2 mm groove diameter or width are used to create the groove design and dimensions in FIG. 14, assuming the same spin weld parameters described above. An insert (e.g., first component 302 having first weld surface 304) with a radius 310 of about 23 mm in length would have about 11 grooves 322 with a 2 mm radius (or width 324), each separated by an angle 316 of about 33.5 degrees, which leads to a collapse width 320 of about 0.75 mm. Further, an insert (e.g., first component 302 having weld surface 304) with a radius 310 of about 72 mm in length would have about 34 grooves 322 with a 2 mm radius (or width 324), each separated by an angle 316 of about 10.6 degrees, again leading to a collapse width 320 of about 0.75 mm.

Thus, the present disclosure further contemplates part designs that enable successful spin welding of polymeric (e.g., reinforced thermoplastic) components with large, concentric contacting weld surface areas (e.g., greater than or equal to about 10 in² in certain variations). By incorporating grooves along a surface of a part, where the grooves are substantially perpendicular to a welding rotation direction, spin welding of concentric mating components under relatively low forces and speeds is provided. This technique thus avoids premature polymer degradation at an inner edge (smaller diameter) of mating parts to be joined. Moreover, because constant and relatively low speed can be used, cheap, easy and readily accessible tooling and process can be used instead of expensive specialized spin-welders.

Traditional spin welded processes are not done on weld surfaces of varying diameter. Further, the smaller the diameter of the component parts to be spin-welded, the greater the spinning speed. Although, a hemispherical weld surface would require both low and high speed to weld the centermost smaller radius and lower speed to weld the outermost radius, the groove design according to certain aspects of the present disclosure permits a uniform, constant speed to be used throughout the welding process, without suffering premature degradation of the polymer at the outer edge by reducing the overall contact surface area of the weld surfaces.

In certain other variations, the present disclosure contemplates spin welding two polymeric parts together, where the each weld surface in a joint interface region on each respective part is selected to define distinct, asymmetric, and/or non-complementary shapes to one another. Such a spin welding technique is particularly suitable for joining large surface area joint interfaces. In other words, a first weld surface of a first stationary component to be joined at the joint interface region defines a first shape and a second weld surface of a second stationary component to be joined at the joint interface defines a second shape. The first shape and the second shape are selected to be distinct and not complementary to one another (e.g., not inverted convex and concave complementary shapes), so that the shapes are asymmetric to one another. The respective components can define a shape that is symmetric with respect to an axis of rotation, but asymmetric or non-complementary with respect to the counterpart shape to which it will be joined via spin welding. The joining of such large surface area parts, especially those with non-complementary or asymmetrical shaped surfaces, by spin welding has not been previously possible or contemplated. For example, excessively high temperatures attendant with joining asymmetric shapes or shapes with large surface areas previously caused structural damage to the polymeric materials (especially adjacent to and within the joint region), thus potentially causing premature weld joint failure and other issues.

As a result, the present disclosure enables friction welding processes to be conducted without suffering from such issues, while using inexpensive tooling (e.g., similar to milling machines), lowering operation costs, and minimizing any need for pre-welding part design development. Traditional milling machines can be used having relatively lower rotational speed ranges and lower forces (e.g., less than about 3,500 rpm and pressures of less than about 4 MPa) to produce good quality welds.

Furthermore, the part or component design provided by certain aspects of the present disclosure allows for the molten or flowing material produced during the process to be channeled out of the weld area as the weld process/cycle progresses, thereby yielding high quality welds over the entire welded surface. The component designs according to various aspects of the present disclosure allow for the flowing or molten material generated during spin welding (e.g., flash) to be directed or pushed away from the contacting area (at the weld surfaces). This can be achieved gradually as the welding cycle proceeds. In one variation, the flowing material or flash can be channeled through the grooves to the outer edge of the regions being joined. In another variation, a gap formed between the respective weld surfaces increases, because the parts are selected to have mismatched shapes that are thus asymmetric or non-complementary. Hence, the non-complementary shapes define a variably sized gap between the weld surfaces, which increases in dimension towards the outermost edge of the regions being joined to facilitate adequate volume for flash movement and flow (as will be discussed further herein). In the absence of such designs provided by certain aspects of the present disclosure, the energy and heat generated by friction at the spin-welding interface could otherwise cause the polymer to exceed melting temperatures and potentially result in damage to the component leading to weak or defective weld joints. Such large surface area and/or non-complementary components were not otherwise weldable using conventional spin welding techniques (as premature polymer degradation at an outer edge and trapped air through a weld line created weak and potentially damaged weld joints).

FIGS. 9 and 10 show another variation of a spin-welding tool component assembly 200 according to certain aspects of the present disclosure. FIG. 9 shows the overall tool component assembly 200, while FIG. 10 shows a sectional view of a weld joint interface region formed by spin-welding. A first component 202 may be stationary and like the component shown in FIG. 2 is non-cylindrical (having an overall rectangular shape). A second component 204 is rotatable and spun about axis 210. Both first and second components 202, 204 may be formed of a polymeric material or polymeric composite material, as discussed above. First component 202 and second component 204 are arranged or aligned substantially along axis 210 prior to commencing spin welding. First component 202 defines a concave interface region 212 defining a first weld surface 214, while second component 204 defines a complementary convex interface region 216 defining a second weld surface 218. The first component 202 and second component 204 thus each respectively define interfacing regions along the first weld surface 214 of concave interface region 212 and the second weld surface 218 of convex interface region 216 that will be joined together at a weld joint interface 206, where the friction weld is formed there between. In certain aspects, the present disclosure generally pertains to spin welding of a first component having a recessed region and a second component having a protruding region that can be received with the recessed region of the first component and thus welded together at a weld joint interface. Notably, in the variation shown here, concave interface region 212 and convex interface region 216 together define distinct asymmetric shapes that are non-complementary to one another. The selection of intentionally mismatched shapes permits formation of a variably sized gap between the weld surface that increases in dimension towards the outermost edge of the regions being joined to facilitate adequate volume for flash movement and flow. Such a discrete weld line progression during the spin welding process controls heat generated and enables welding speeds to remain relatively low.

More specifically, first weld surface 214 of concave interface region 212 defines an inverted hemispherical shape, while second weld surface 218 of convex interface region 216 defines a portion of an ellipsoidal shape, each of which is fully concentric and symmetrical around axis 210. While the ellipsoidal shape can fit within and interface with the inverted hemispherical shape of the concave interface region 212, the inverted hemispherical shape and the ellipsoidal shape do not match or mate with one another along the entire weld surface, as they have differing shapes. Thus, the first weld surface 214 of concave interface region 212 and the second weld surface 218 of convex interface region 216 are not complementary to one another, as shown in FIG. 9, yet can still be subjected to spin-welding in accordance with certain aspects of the present disclosure to join the first component 202 is joined with the second component 204. It should be appreciated that the shapes of first weld surface 214 and second weld surface 218 are not limited to the specific shapes shown in FIG. 9, but rather a variety of different shapes are contemplated so long as they are symmetric about the axis (e.g., 210) or concentric and the second rotating component can be inserted into the cavity defined by the first component. Notably, the spin-welding tool component assembly 200 in the embodiment shown in FIG. 9 is symmetrical about axis 210, but the shapes defined by the weld surfaces of the respective first and second components 202, 204 are non-complementary shapes to one another.

As shown, second component 204 has been molded around an insert 220 (e.g., a spindle or rod). Thus, first component 202 defines a cavity 222 for receiving insert 220 of second component 204 as the spin-welding joining process occurs. The insert 220, is optional, and may facilitate rotation of the second component 204 within the rotating tool assembly. Alternatively, the tool for retaining second component 204 may be modified to hold and rotate the second component 204 during spin-welding. After spin-welding, an exposed outermost welded region 224 is formed between the first component 202 and second component 204 corresponding to the weld joint interface region 206, where materials have softened and fused to create a robust bond between the first weld surface 214 of concave interface region 212 and the second weld surface 218 of convex interface region 216.

The embodiment shown in FIGS. 9 and 10 provides for reduced initial contact area during spin welding, which allows for spin welding of featureless parts together that have large diameters, and therefore large surface areas. The larger radius area is not initially heated because it is not in contact until later during the welding cycle. For example, when the first component 202 is lowered into position near the second component 204 for welding (as best shown in FIG. 10), due to the distinct shape of each component, a first dimension 230 between the respective components is smaller at the apex or lowest part of the assembly, while a second dimension 234 is greatest near the outer peripheral edges or highest part of the weld joint interface 206. Stated in another way, the intentionally mismatched and asymmetric shapes defined by the first weld surface 214 and second weld surface 218 form a variably sized gap for the joint interface region 206, where the gap increases in dimension from an initial width at first dimension 230 towards the edge of outermost welded region 224 where at second dimension 234 the gap is the largest, providing greater volume for flash movement and flow. Thus, when spin welding begins about axis 210, initial contact is established in first contact region 232 due to this being the only region where the shapes are in close proximity to one another. As spin welding progresses, the softened polymeric material or flash in the weld joint interface region 206 is pushed upwards and outwards (shown by an arrow) towards a second contact region 236 during the spin welding process, thus establishing a progressive advancing weld line that travels up the gap towards the outer terminal region of the weld line corresponding second dimension 234.

The flash is thus pushed forward toward an edge of the outermost welded region 224 allowing for more of the weld surfaces of the first component 202 and second component 204 to come in contact with one another and begin fusing or welding together near the first contact region 232. As the weld cycle and spinning continue, contact between the surfaces of the parts gradually progresses to the upper regions of the gap near the second contact region 236. The gap between respective components 202, 204 at this point (at the outermost welded region 224) corresponds to the second dimension 234, which is the largest within the weld joint interface 206. This allows for the molten material produced during the process to be pushed forward of the advancing weld line as the process progresses. Such methods of spin-welding distinctly shaped components (having asymmetric, non-complementary shapes) reduce any risk of high heat generation and premature degradation of the polymer.

Because the flash moves away from the weld surface during the spin-welding cycle, the weld that is produced is of especially high quality (e.g., no trapped air within the weld joint interface region 206). Further, unwanted flash generated at the exposed outermost welded region 224 can be avoided by providing adequate volume within the weld joint interface region 206, which thus reduces costly and timely post-welding deflashing/flash removal operations. Lastly, although constant welding speed can be maintained, no premature degradation of the polymer at an outer weld line region 224 occurs (which previously would be the case where the components were complementary and symmetric shapes).

Hence, in certain aspects, the present disclosure contemplates a friction-weld assembly comprising a first polymeric component having a first weld surface defining a concave region having a first shape. A second polymeric component comprising a second weld surface defining a convex region having a second shape that rotates during friction welding. At least one of the first weld surface or the second weld surface has a surface area corresponding to the friction weld joint of greater than or equal to about 3,000 mm² (about 4.7 in²). In certain aspects, the first shape and the second shape are symmetric and complementary with respect to one another. Further, in certain other aspects, the first shape and the second shape are asymmetric, non-complementary shapes with respect to one another. At least one of the first polymeric component or the second polymeric component remains stationary on a fixed tool, while the other of the first polymeric component and the second polymeric component is rotatable on a rotating tool during friction welding that forms a friction weld joint between the first weld surface and the second weld surface.

At least one of the first polymeric components or the second polymeric components may be formed from a composite material comprising a thermoplastic polymer and a reinforcement material, as described previously above. In certain variations, the first shape and the second shape are distinct from and non-complementary with respect to one another. In other aspects, the first shape and the second shape are substantially round shapes. In certain variations, the first shape is selected from a hemispherical shape and an ellipsoidal shape, while the second shape is selected from the other of the hemispherical shape and the ellipsoidal shape. The surface area may optionally be any of the large surface areas specified previously above, such as being greater than or equal to about 3,225 mm² (about 5 in²) to less than or equal to about 16,200 mm² (about 25.1 in²) or optionally greater than or equal to about 3,225 mm² (about 5 in²) to less than or equal to about 16,200 mm² (about 25.1 in²). In certain other aspects, the first weld surface and/or the second weld surface may have a plurality of grooves formed therein.

An exemplary method for designing the insert or rotatable second component 204 is discussed herein. As noted above and further shown in FIGS. 11 and 12, the second component 204 has a semi-ellipsoidal shape defined by the second weld surface 218. First component 202 is the stationary part with the concave interface region 212 defining a hemispherical shape along the first weld surface 214. The angles between the respective radii of either the first component 202 or the second component 204 and the axis 210 (extending to the first weld surface 214 of the second weld surface 218) vary from 30 to 90 degrees. The spin weld time is assumed to be about 3 seconds in duration with a rotation speed of about 3,000 rpm. For purposes of this example, "insert" refers to the second component 204 and "part" refers to the first component 202. A radius of the part (first component 204) can be determined to be $R_{Part}=R_o-$"collapse," where $R_o$ is defined as the "weld line" radius or width (shown as 224 in FIG. 10). 1 mm is arbitrarily added (this dimension may be selected to remain small to allow for progressive weld progression, although ideally this dimension is less than 2 mm and more ideally between about 0.5 mm to 1.5 mm) to the large ellipse radius: $R_{Insert}^a=[R_o+$"collapse"+1 mm]. $R_{Insert}^a$ corresponds to the radius labeled 254 in FIG. 12. Then, $R_{Insert}^b=R_{Insert}^c$ is calculated based on the required insert volume, so that the volume difference between the ellipsoid insert and the part makes up for the targeted collapse:

$$R_{Insert}^b = R_{Insert}^c = \sqrt{\frac{6V}{4\pi R_{Insert}^a}}$$

$R_{Insert}^b$ Corresponds to dimension 252 shown in FIGS. 11 and 12, while $R_{Insert}^c$ is 254 in FIG. 12. $R_{Insert}^a>(R_{Insert}^b=R_{Insert}^c)$. V is the volume of the second component 204, so that the volume difference between the semi-ellipsoidal second component 204 and the hemispherical first component 202 creates the preselected collapse amount in the weld joint interface 206. In this example, the collapse width may range from 0 mm to 1 mm. Calculations for a range of minimum and maximum radii are calculated in Table 2 below.

| Collapse (mm) | Min. Outer part radius (mm) | Max. Outer part radius (mm) | $R_{Insert}^a$ for min. insert (mm) | $R_{Insert}^b = R_{Insert}^c$ for min. insert (mm) | $R_{Insert}^a$ for max. insert (mm) | $R_{Insert}^b = R_{Insert}^c$ for max. insert (mm) |
|---|---|---|---|---|---|---|
| 0 | 22.86 | 71.63 | 23.86 | 22.38 | 72.63 | 71.13 |
| 0.5 | 22.61 | 71.38 | 24.11 | 22.63 | 72.88 | 71.38 |
| 0.75 | 22.49 | 71.25 | 24.24 | 22.75 | 73.00 | 71.51 |
| 1 | 22.36 | 71.13 | 24.36 | 22.88 | 73.13 | 71.63 |

Thus, the dimension 250 that extends from a top to bottom of the large surface area second rotatable component 204 in such an example may range from greater than or equal to about 23 mm to less than or equal to about 74 mm. Likewise, dimensions 252 and 254 may similarly range from greater than or equal to about 22 mm to less than or equal to about 72 mm for a large surface area second rotatable component 204.

As noted above, by employing such friction-weld assembly component designs, concentric complementary hemispherical components of medium to large surface area may be spin-welded together at relatively low and constant speeds and low forces on traditional milling equipment. Therefore, depending on part design and welding objectives, flash can be contained within the welded area, instead of protruding outside of the welded area, further eliminating any need for additional, complex part designs, reducing post welding timely and costly deflashing operation and reducing pre-welding part design. Components or parts to be welded together may be produced using standard polymer manufacturing processes, such as injection molding and compression molding, with no risk of die lock situations, due to simple component designs. In certain aspects, the components may have an attachment location to allow placement or setting of the tool inside a portion of the component that will resist the torque imposed during the welding process. Thus, the present technology enables spin welding of large surface area, thermoplastic polymer components or parts and of reinforced thermoplastic polymer components or parts at low speeds and low forces by selection of particular designs for the components.

Accordingly, the present disclosure provides methods of friction welding or spin-welding. For example, such a method may comprise rotating a first polymeric component having a first weld surface defining a first shape at a speed of less than or equal to about 3,500 revolutions per minute (rpm). Then, the first weld surface of the first polymeric component is contacted with a second weld surface of a second polymeric component that is held stationary, while the first polymeric component rotates, to create a weld joint between the first polymeric component and the second polymeric component. In certain variations, the contacting may occur under an applied pressure of greater than or equal to about 1 MPa to less than or equal to about 4 MPa. In certain aspects, a preferred amount of applied pressure during spin welding is about 2 MPa.

By way of example, where the surface area is about 3,225 mm$^2$ (about 5 in$^2$), the force during spin welding (F=A*P, where A is area and P is applied pressure) may be greater than or equal to about 3,226 Newtons (N) to less than or equal to about 12,800 N. Where the surface area is about 16,200 mm$^2$ (about 25.1 in$^2$), the force during spin welding may be greater than or equal to about 16,129 N to less than or equal to about 64,516 N, by way of example. The melt thickness range may be greater than or equal to about 0.5 to less than or equal to about 1.5 mm. One of the first weld surface of the first polymeric component or the second weld surface of the second polymeric component defines a concave region, while the other of the first weld surface or the second weld surface defines a convex region. The weld joint thus formed is of high quality and robust.

In certain aspects, the rotating and the contacting occur concurrently in either a constant speed spin-welding process or a variable speed spin-welding process. In certain variations, the rotating may occur in such a process at a speed of less than or equal to about 3,500 rpm, and thus may be conducted on equipment that is not specialized for spin welding (e.g., on lower rotational speed milling equipment). In certain variations, the rotating may occur in a spin welding process at a speed ranging from greater than or equal to about 200 rpm to less than or equal to about 3,500 rpm. The rotating and the contacting may optionally occur concurrently for a duration of greater than or equal to about 1 second to less than or equal to about 10 seconds. In certain aspects, the first weld surface and/or the second weld surface has a surface area corresponding to the friction weld joint of greater than or equal to about 3,000 mm$^2$ (about 4.7 in$^2$). In other aspects, at least one of the first weld surface and/or the second weld surface has a plurality of grooves formed, which can thus yield high quality welds over the entire (final) welded joint interface.

By way of non-limiting example, melting typically occurs at linear spin welding speeds of about 360 inches/second (about 550 meters/minute) to about 600 in/s (about 914 m/min) for nylon. Notably, this range of linear speeds for melting may vary depending on the type of resin and overall material composition. The spin welding time may vary from greater than or equal to about 1 second to less than or equal to about 10 seconds. For example, where the parts have a smaller radius and a low angle (e.g., near 30 degrees), spin times may be greater than or equal to about 5 seconds to less than or equal to about 10 seconds. For a larger radius part (with greater dimensions) with any angle, the spin time may be greater than or equal to about 1 second to less than or equal to about 5 seconds. As discussed above, rotational speed increases with decreasing radius of the parts during spin welding. The shear rate increases with decreasing radius of the parts. Torque required by the tool to rotate the part (τ=reactive frictional torque+driving torque) is proportional to surface area, rotational speed, and shear rate.

In one example, a radius of the rotating part is about 6 mm and an angle ranges from 30 to 90. A spin welding duration may be about 10 seconds and thus, the rotating speed may be about 1,772 rpm to about 2,953 rpm. In another example, the radius of the rotating part is about 23 mm and the angle ranges from 30 to 90. In such an example, a spin welding duration ranges from 2 to 10 seconds and the rotating may occur at a speed of about 472 rpm to about 3,281 rpm. In yet another example, the radius of the rotating part is about 72 mm and the angle ranges from 30 to 90, a spin welding duration ranges from 1 to 10 seconds, and the rotating may occur at a speed of about 151 rpm to about 3,016 rpm.

Thus, in accordance with various aspects, the design of polymeric components to be spin-welded creates superior weld joints without collateral damage to the polymeric materials. Further, design of such polymeric parts to be welded enables spin welding using cheaper, more accessible equipment, by reducing a velocity required for spin welding of large surface area parts. By use of such component designs, concentric, non-complementary, large surface area parts (e.g., hemispherical and ellipsoidal counterpart regions of components) can be mated and successfully spin welded together. In certain aspects, such a component design allows for relatively constant surface areas to be welded discretely throughout the spin-welding process, thereby allowing for spin welding at a constant and low speed, and constant and low force throughout the process without impacting badly the weld quality and avoiding premature polymer degradation at the outer edge of the part. In other aspects, a level of force required for spin welding such large surface area parts is also reduced. Notably, in certain aspects, the methods are particularly suitable where a weld area is a large surface area, but are less suitable for use with traditional cylindrical, small surface area parts to be spin-welded together. As noted above, traditional spin welded processes were not possible on weld surfaces of varying diameter or large surface areas, as it would result in uneven weld quality due to the varying force requirement of the process when operating at larger or smaller distance from the rotational axis. Further, if the components according to certain aspects of the present disclosure, e.g., non-complementary or asymmetric concentric parts, were used in specialized high rpm spin-welding machines (having higher speed above 3,500 rpm and higher applied forces), while the same apparent welded surface may be formed, because the speed would be kept constant, the weld quality achieved would potentially be inconsistent throughout. Thus, the weld joint could be weak and susceptible to failure. Moreover, because flash produced during the process would not be pushed away from the welded surface as the process progresses in a conventional spin welding machine, air could likely be trapped in the weld line, therefore producing weaker and unpredictable weld joints.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly for friction welding, comprising:
   a first polymeric component comprising a first weld surface defining a first shape and comprising a plurality of grooves having an orientation perpendicular to a direction of rotation, wherein the plurality of grooves comprises a first plurality of grooves defining a first length and a second plurality of grooves defining a second length less than the first length; and
   a second polymeric component comprising a second weld surface defining a second shape, wherein one of the first shape or the second shape is convex, while the other of the first shape or the second shape is concave; wherein the first weld surface and the second weld surface are configured to form a friction weld therebetween when one of the first polymeric component or the second polymeric component remains stationary on a fixed tool, while the other of the first polymeric component or the second polymeric component is rotatable on a rotating tool during friction welding that forms the friction weld joint.

2. The assembly of claim 1, wherein at least one of the first polymeric component or the second polymeric component is formed from a composite material comprising a thermoplastic polymer and a reinforcement material.

3. The assembly of claim 1, wherein each groove of the first plurality of grooves extends from a central region of the first weld surface to an outer perimeter of the first weld surface.

4. The assembly of claim 1, wherein the plurality of grooves comprises greater than or equal to about 3 to less than or equal to about 182 grooves on the first weld surface.

5. The assembly of claim 1, wherein each groove of the plurality of grooves has a width of greater than or equal to about 0.5 mm to less than or equal to about 3 mm and a depth of greater than or equal to about 0.5 mm to less than or equal to about 3 mm.

6. The assembly of claim 1, wherein at least one groove of the plurality of grooves defines a shape on the first weld surface selected from the group consisting of: a triangle, a rectangle, and a quadrilateral.

7. The assembly of claim 1, wherein the first shape and the second shape are complementary with respect to one another.

8. The assembly of claim 1, wherein the first shape and the second shape are substantially round shapes.

9. A method of spin-welding, comprising:
   rotating a first polymeric component having a first weld surface defining a first shape at a speed of less than or equal to about 3,500 revolutions per minute (rpm), wherein the first weld surface comprises a plurality of grooves having an orientation perpendicular to a direction of rotation and the plurality of grooves comprises a first plurality of grooves defining a first length and a second plurality of grooves defining a second length less than the first length; and
   contacting the first weld surface of the first polymeric component with a second weld surface defining a second shape of a second polymeric component that is held stationary while the first polymeric component rotates to create a weld joint between the first polymeric component and the second polymeric component, wherein one of the first shape of the first weld surface of the first polymeric component or the second shape of the second weld surface of the second polymeric component is concave, while the other of the first shape of the first weld surface or the second shape of the second weld surface is convex.

10. The method of claim 9, wherein the contacting occurs under an applied pressure of greater than or equal to about 1 MPa to less than or equal to about 4 MPa.

11. The method of claim 9, wherein the rotating and the contacting occur concurrently in either a constant speed spin-welding process or a variable speed spin-welding process.

12. The method of claim 11, wherein the rotating occurs at a speed ranging from greater than or equal to about 200 rpm to less than or equal to about 3,500 rpm.

13. The method of claim 9, wherein the rotating and the contacting occur concurrently for a duration of greater than or equal to about 1 second to less than or equal to about 10 seconds.

14. An assembly for friction welding, comprising:
   a first polymeric component comprising a first weld surface defining a first shape and comprising a plurality of grooves having an orientation perpendicular to a direction of rotation, wherein the plurality of grooves comprises a first plurality of grooves defining a first length, a second plurality of grooves defining a second length less than the first length, and a third plurality of grooves defining a third length that is less than both the first length and the second length; and
   a second polymeric component comprising a second weld surface defining a second shape, wherein one of the first shape or the second shape is convex, while the other of the first shape or the second shape is concave; wherein the first weld surface and the second weld surface are configured to form a friction weld therebetween when one of the first polymeric component or the second polymeric component remains stationary on a fixed tool, while the other of the first polymeric component or the second polymeric component is rotatable on a rotating tool during friction welding that forms the friction weld joint.

* * * * *